United States Patent [19]

Simms et al.

[11] Patent Number: 5,808,564
[45] Date of Patent: Sep. 15, 1998

[54] PERSONAL SECURITY SYSTEM WITH REMOTE ACTIVATION

[75] Inventors: James Robert Simms, Fulton; Charles Glenn Simms, Owings Mills; Daniel Donnelly Moore, Jr., Baltimore, all of Md.

[73] Assignee: Simms Security Corp., Columbia, Md.

[21] Appl. No.: 657,054

[22] Filed: May 28, 1996

Related U.S. Application Data

[63] Continuation of Ser. No. 284,101, Aug. 1, 1994, abandoned, which is a continuation-in-part of Ser. No. 831,901, Feb. 6, 1992, Pat. No. 5,334,974.

[51] Int. Cl.[6] .................................................. G08G 1/123
[52] U.S. Cl. ...................... 340/990; 340/426; 340/988; 340/995; 342/457; 364/460; 379/59
[58] Field of Search ..................................... 340/988, 989, 340/990–993, 539, 426, 995, 574, 434, 286.13, 286.14, 905; 180/287; 379/59, 37, 38, 39, 40, 44, 45; 342/457, 357; 364/424.04, 449, 460

[56] References Cited

U.S. PATENT DOCUMENTS

| | | | |
|---|---|---|---|
| 4,354,275 | 10/1982 | Bouyssounouse et al. | 340/539 |
| 4,523,178 | 6/1985 | Fulhorst | 340/426 |
| 4,606,073 | 8/1986 | Moore | 340/539 |
| 4,651,157 | 3/1987 | Gray et al. | 340/539 |
| 4,689,603 | 8/1987 | Conigliaro et al. | 340/426 |
| 4,884,055 | 11/1989 | Memmola | 340/426 |
| 5,081,667 | 1/1992 | Drori et al. | 340/539 |
| 5,276,728 | 1/1994 | Pagliaroli et al. | 340/426 |
| 5,319,698 | 6/1994 | Glidewell et al. | 340/426 |
| 5,334,974 | 8/1994 | Simms et al. | 340/426 |
| 5,365,217 | 11/1994 | Toner | 340/539 |
| 5,497,149 | 3/1996 | Fast | 340/988 |

*Primary Examiner*—Brent A. Swarthout
*Attorney, Agent, or Firm*—Law Offices of Royal W. Craig

[57] ABSTRACT

A fully automatic personal security system including a mobile unit which communicates emergency data including position coordinates, vehicle and personal data, and a central dispatch station which receives the emergency data and accurately displays all necessary emergency information superposed on a digitized map at a position corresponding to the location of the mobile unit. The personal security system also includes a hand-held remote "panic button" unit to allow a call for help from the general location around the vehicle.

8 Claims, 9 Drawing Sheets

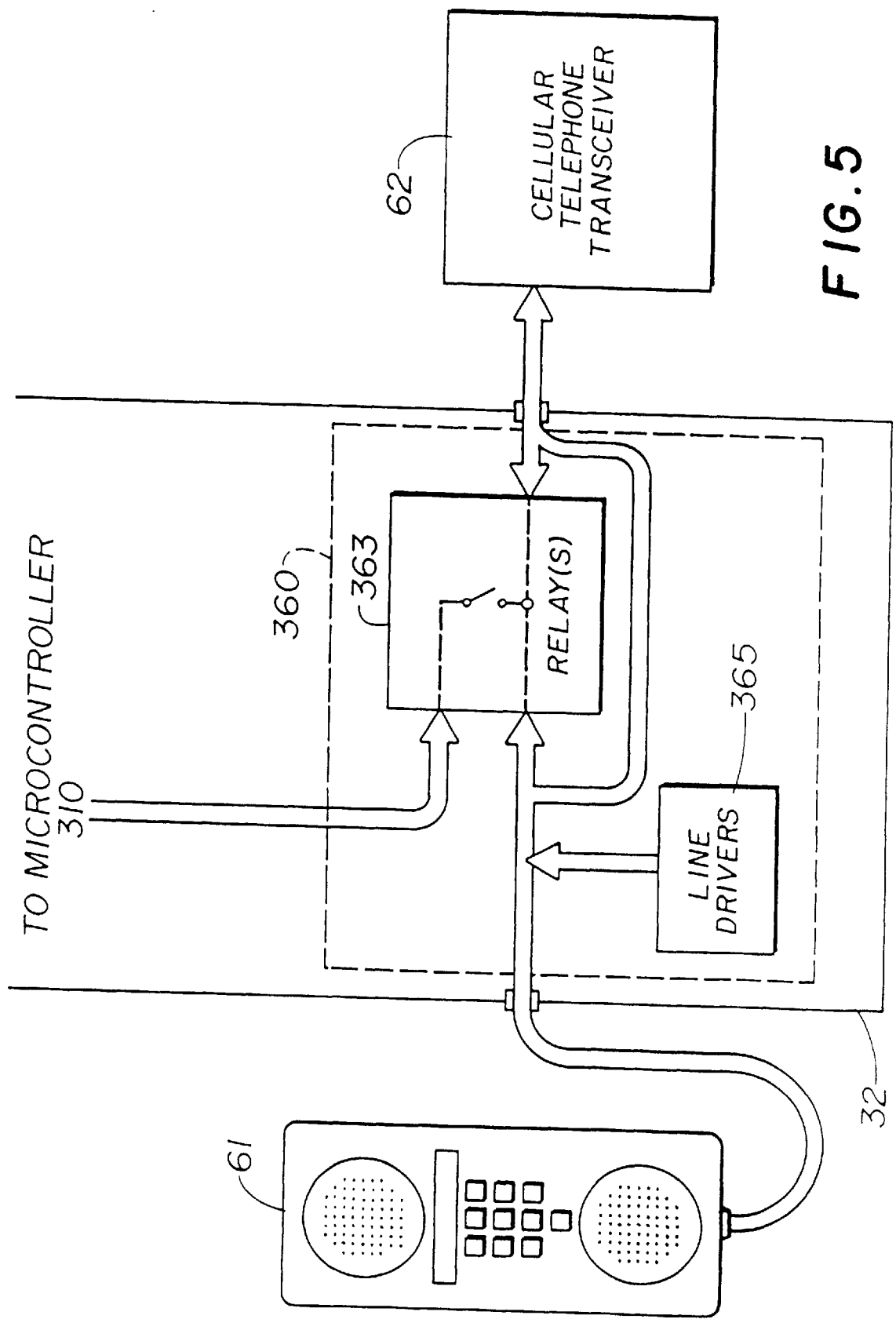

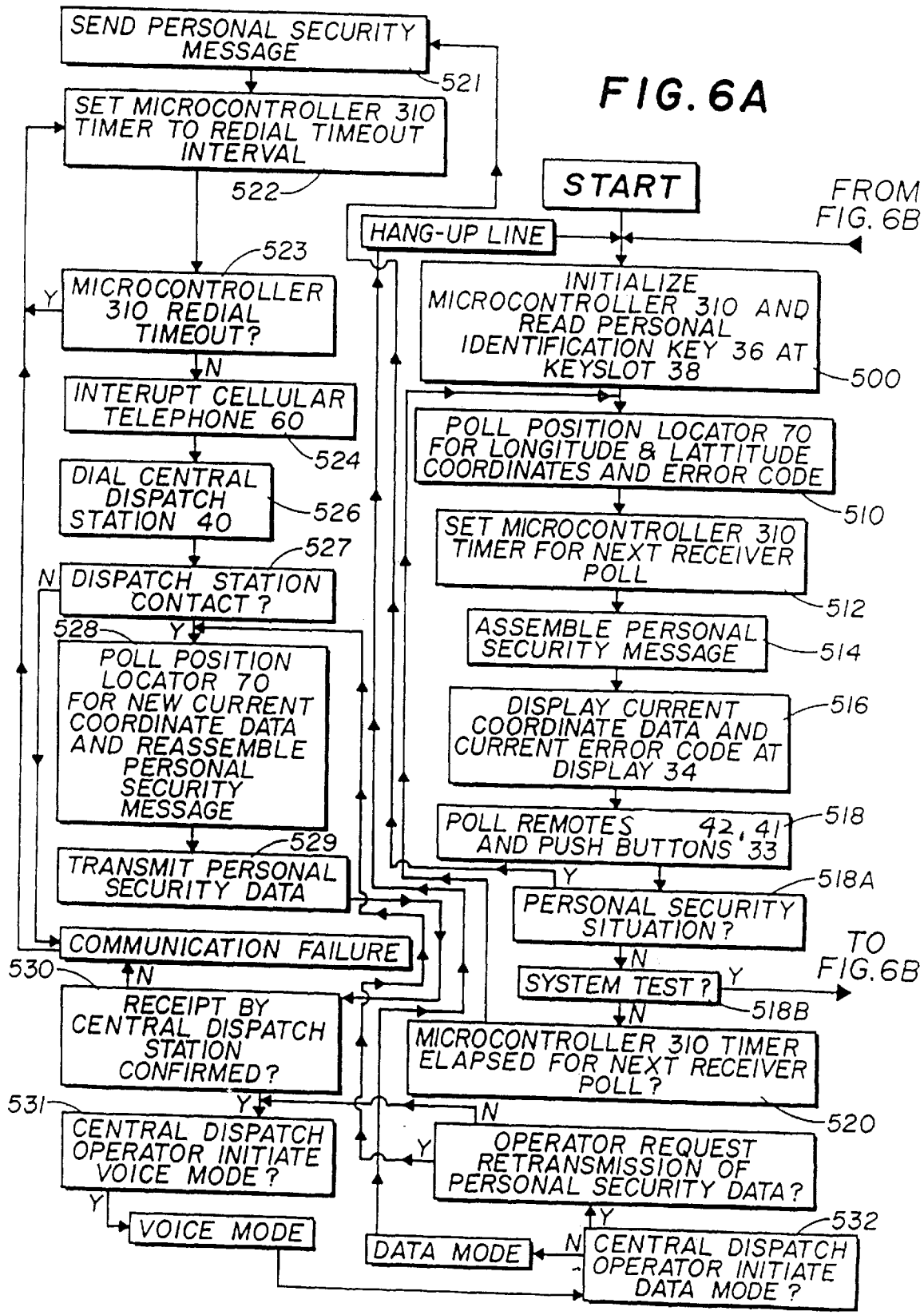

PERSONAL SECURITY SYSTEM WITH REMOTE ACTIVATION

CROSS-REFERENCE TO RELATED APPLICATIONS

This application is a continuation of application Ser. No. 08/284,101 filed on Aug. 1, 1994, now abandoned, which is a continuation-in-part of U.S. patent application Ser. No.: 07/831,901 for "PERSONAL SECURITY SYSTEM"; filed Feb. 6, 1992, now U.S. Pat. No. 5,334,974.

BACKGROUND OF THE INVENTION

1. Field of the Invention

The present invention relates generally to a security system for protecting vehicles and the people travelling therein. In particular, the present invention is a device for expediting a response by the appropriate authorities whenever and wherever the personal security of a mobile person is compromised. A portable remote activation unit is provided to allow remote control of the security system.

2. Description of the Background

A number of prior art devices have been proposed for automating the dispatch of the proper authorities to a vehicle in an emergency situation.

For example, U.S. Pat. No. 4,651,157 issued to Gray et al. teaches a vehicle tracking system including a mobile unit, and a central station comprised of a separate security computer 40, tracking computer 42 and monitor 44. The security computer 40 initiates the scanning and polling of the mobile unit and stores identification data relating to the mobile unit (see column 7, lines 35–46). The tracking computer 42 receives raw time-delays from a LORAN-C receiver 14 of the mobile unit and converts them into usable latitude and longitude coordinates. The coordinates are then displayed at the monitor 44.

U.S. Pat. No. 3,568,161 issued to Knickel discloses a vehicle locator system comprising a network of sensors tied to a central command station. A vehicle travelling amidst the sensors emits a code to the sensors which is indicative of the identity of the vehicle. The code is received at the nearest sensor station, which in turn signals the central command station that it has received the code.

The location of the vehicle is then displayed at the central station. The central command station includes a display panel with a number of lights placed on a map at locations corresponding to each sensor.

U.S. Pat. No. 4,596,988 issued to Wanka likewise discloses a remote-control tracking transmitter and tracking support network of remote stations. As a vehicle passes through the network, the vehicle communicates with a remote station. The remote station in turn transmits location data to a base station which plots the location on a map plotter.

U.S. Pat. No. 4,904,983 issued to Mitchell discloses a theft alarm system for vehicles including an alarm sensor, an auto-dialing mechanism, and a cellular telephone. The alarm sensor activates the auto-dialing mechanism to seize the cellular telephone and dial a central station. A recorder then broadcasts a two-part message over the cellular telephone. The message includes fixed information relating to the identity of the automobile and variable information relating to the location of the automobile. The variable information may be input by the operator through a microphone when the vehicle is to be left unattended.

U.S. Pat. No. Re. 32,856 issued to Milisap et al. discloses an alarm system in which an alarm condition causes a cellular transceiver to automatically transmit a telephone call to a central station. The invention incorporates a cellular telephone link in a fixed alarm system. The use of a cellular telephone eliminates the need for telephone lines. Hence, cutting of the telephone lines will not result in negation of the alarm signal. A circuit is also shown for determining a particular zone in which the alarm condition exists and for transmitting alarm information to the central station via the cellular telephone.

In addition to the above-described alarm systems, a number of improvements have been developed for particular components of the alarm systems.

For instance, U.S. Pat. No. 3,683,114 issued to Egan et al. discloses an automatic dialing and reporting system which is responsive to an alarm condition. The Egan et al. device seizes a telephone line and initiates automatic transmission over the telephone line.

U.S. Pat. No. 4,428,057 issued to Setliff et al. discloses an electronic system for use in a marine environment. The system includes a plurality of digitized maps which are stored in a database for display on a video terminal. "The purpose of this invention is to provide a more efficient use of the operator's time by automatically correlating and monitoring the data" (Column 1, lines 55–57). The displayed map may be compressed or expanded to meet the demands of the operator. In addition, a LORAN-C or other positioning device may be coupled to the system and the LORAN-C coordinate data may be correlated and displayed at the proper location of the map.

The above-described prior art devices will prevent theft, tampering, and other encroachments on property interests, and they will provide information on a vehicle. However, the prior art does not adequately protect the personal security interests of the passenger(s).

More specifically, too much effort is required of the passenger in an emergency situation and too little information is provided to the authorities to insure a prompt and efficient response.

Personal security demands a fully automated yet economical system for summoning an emergency response in accordance with the specific personal needs of the individual. In satisfaction of the demand, U.S. patent application Ser. No. 07/831,901 filed Feb. 6, 1992, discloses and claims a personal security system including a central dispatch station, and a mobile communication unit mounted in a vehicle and triggered by the occurrence of a variety of personal security conditions to establish cellular telephone contact with the central station.

The mobile communication unit then communicates longitude and latitude coordinate data, emergency, and personal information to the central station. All pertinent information is conveniently displayed to an operator at the central station in a manner which permits the most efficient dispatching possible of the proper responding agents to administer the proper security measures.

The above-described personal security system provides a fully automatic device and protocol which is operative under the most severe circumstances to summon an emergency response in accordance with the specific personal needs of the mobile person. Under less severe circumstances, a mobile person can manually summon assistance. For example, in an automotive application, the vehicle operator can summon road service or the like. This is accomplished by quickly and accurately transmitting to a central dispatch operator specific coded information including LORAN-C or Global Position Satellite (GPS) data. The information is displayed on digitized map in a readily apparent format, and the central dispatch operator gains instant personal information as well as vehicle-specific information for all potential operators of the vehicle. This allows extremely efficient dispatching of emergency or other assistance to the vehicle.

SUMMARY OF THE INVENTION

It is an object of the present invention to provide an improved personal security system of the type disclosed in co-pending U.S. patent application Ser. No. 07/831,901 filed Feb. 6, 1992, with the addition of a remote portable "panic button" unit capable of transmitting a coded signal to a receiver in the mobile unit (mounted within a vehicle). The actuation of the remote portable unit activates the mobile unit to transmit a help request to the central monitoring station. This way, a person within range of the mobile unit (either inside or outside the vehicle) may remotely signal for aid by pressing the "panic button" on the portable hand held unit. For example, the victims of car-jacking crimes are sometimes locked in the trunk of their vehicle by the perpetrator(s). A remote unit can be strapped inside the trunk by Velcro® or other means to give such victims a means of escape.

It is another object to design the remote unit with an RF transmitter, and the mobile unit with an RF receiver such that upon initial remote activation by the transmitter, a specific code is sent by the transmitter to the receiver, and the code is permanently stored by the receiver. Should the same code be detected again, the receiver can discriminate amongst other stored codes and provide a unique identification of the transmitter to the central station. This capability allows identification of the particular person who is operating the portable remote unit from a potential number of people all having remote units which can activate the receiver. This also prevents false detection by other receivers that may by chance be within range.

According to the present invention, the above-described and other objects are accomplished by providing an apparatus for monitoring a vehicle operator. The apparatus includes a portable remote unit to be carried by a vehicle operator, the remote unit further including an RF transmitter activated by a pushbutton to indicate an alarm condition by transmitting a remote unit subscriber number. The apparatus also includes a mobile security assembly conveyed jointly with a vehicle, the mobile security assembly further including a mobile unit having a programmable memory containing identification information characteristic of the vehicle, a keypad for allowing manual indication of an alarm condition, a dedicated receiver for indicating an alarm condition upon receipt of the subscriber number from the remote unit, a position locator for providing position coordinates indicating a location of the mobile entity, and a microcontroller connected to the programmable memory, receiver, keypad and position locator receiver. The microcontroller is triggered when an alarm condition is indicated to input the position coordinates from the position locator and to format a digital security message indicating the alarm condition, identification information and the position coordinates. The personal security apparatus also includes a portable communication device such as a cellular phone connected to said mobile unit and conveyed therewith for transmitting the security message. The personal security message is received at a central dispatch station which then decodes the identification information, position coordinates, and alarm condition from the security message. The central dispatch station includes a video display for displaying a digital map to a dispatch operator. In operation, the central dispatch station automatically correlates the position coordinates to the digital map and displays the identification information, position coordinates, and alarm condition visually on the map.

The invention also provides a method for managing data obtained from a continuously operating position locator to maintain "accurate" coordinate values. The method includes the steps of: 1) periodically reading a set of current latitude and longitude coordinate data, and a reliability rating from a continuously operating position locator; 2) comparing each reliability rating with a predetermined threshold rating; 3) updating a set of "accurate" coordinate values with the current latitude and longitude coordinate data whenever the reliability rating surpasses the predetermined threshold rating.

It should be noted that the invention can be employed with any type of vehicle, including boats and planes.

BRIEF DESCRIPTION OF THE DRAWINGS

The above-described and other objects, features, and advantages of the present invention will become more apparent from the following detailed description of the preferred embodiments and certain modifications thereof when taken together with the accompanying drawings in which:

FIG. 5 is a detailed block diagram of the adapter module 360 of FIG. 4;

FIGS. 6A and 6B are flow-charts showing the preferred operating sequence of the microcontroller 310 of FIG. 4;

DETAILED DESCRIPTION OF THE PREFERRED EMBODIMENT

Figure 1:
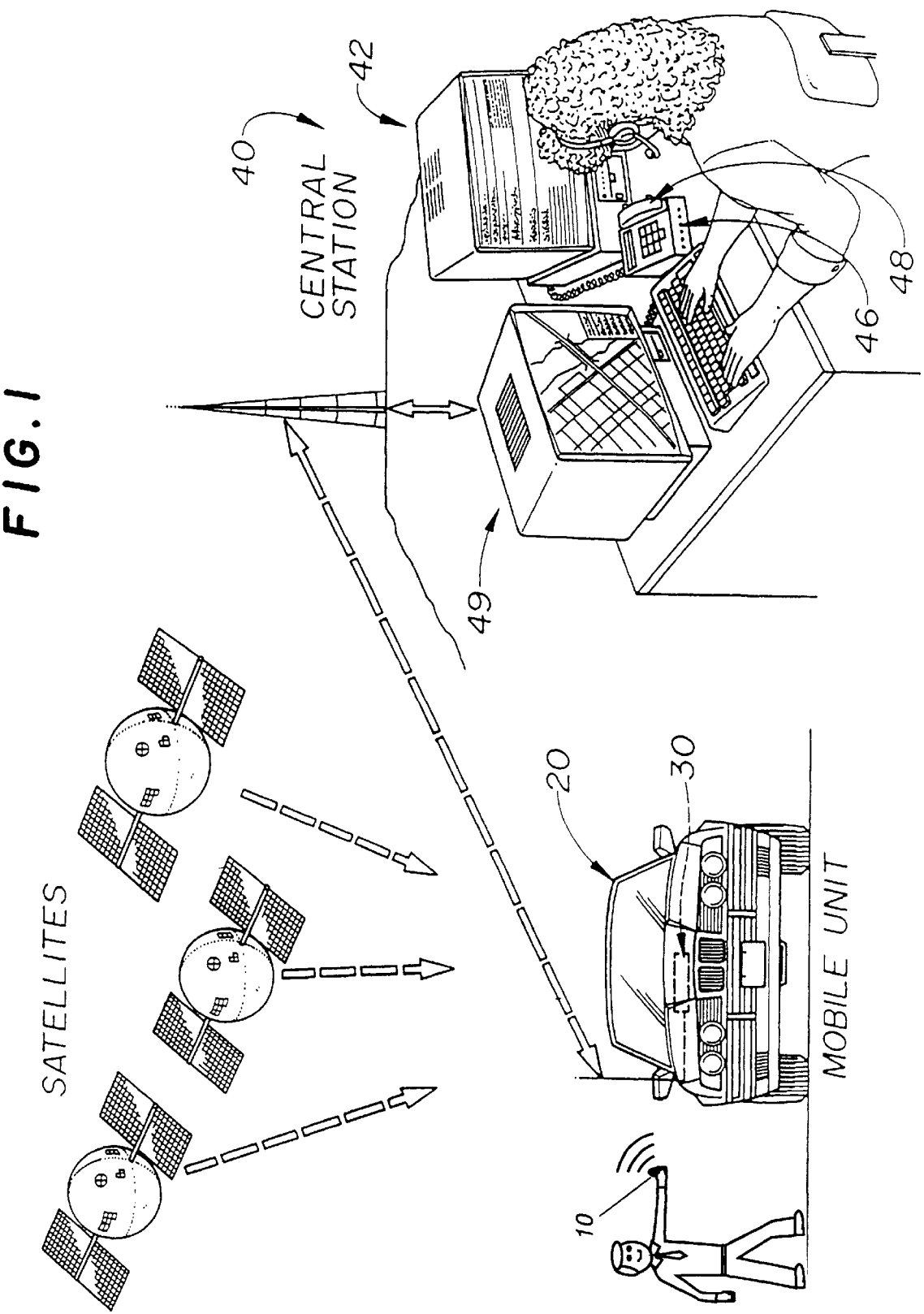
FIG. 1 is a perspective drawing of a personal security system in accordance with the preferred embodiment of the present invention.

Referring now to FIG. 1, an exemplary embodiment of the personal security system generally includes a mobile security assembly 30 which is transported along with a mobile person. Mobile security assembly 30 is shown in FIG. 1 to be incorporated in an automobile 20. Alternatively, mobile security assembly 30 may be incorporated in any other type of vehicle. The personal security system also includes a portable remote unit 10 which may be hand-carried by the automobile operator when outside the auto. In addition, a central dispatch station 40 is manned by a central dispatch operator.

In general operation, the mobile security assembly 30 is automatically triggered by the occurrence of a variety of personal security conditions or is manually operated via remote unit 10, or a button or buttons on the mobile security assembly 30 itself to initiate contact with the central dispatch station 40. Once a communication link is established, the mobile security assembly 30 communicates a hierarchy of longitude and latitude coordinate data, as well as emergency and personal information to the central dispatch station 40. The information is conveniently displayed to the dispatch operator.

It is the combination of the coordinate data hierarchy and the automatic communication protocol, as well as the specific content of the information and the unique format in which it is displayed at central station 40 which allows the operator to dispatch the proper responding agents. The response is more efficient, more accurate, and it is based on foreknowledge of the proper security measures to be taken.

Figure 2:
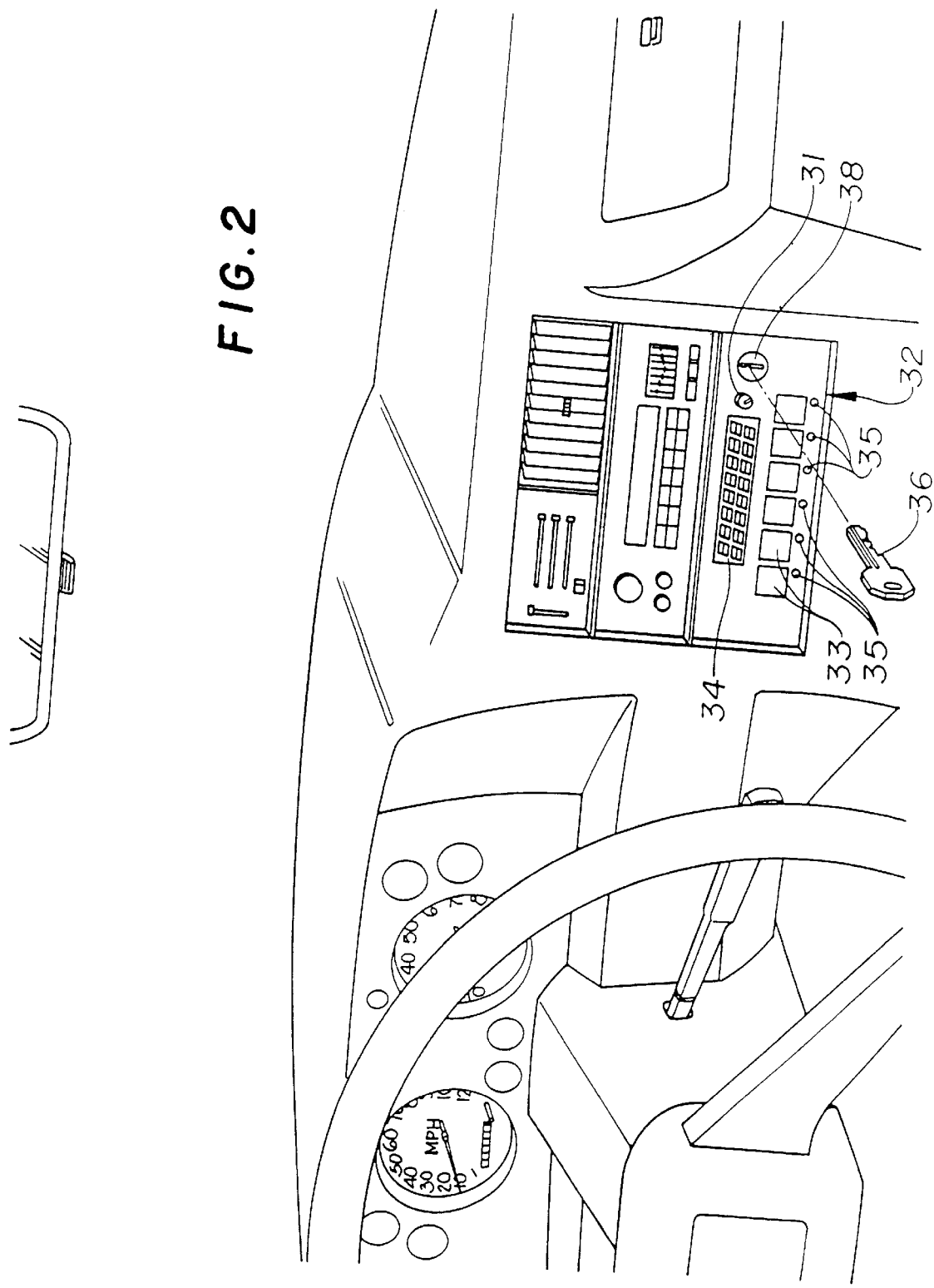
FIG. 2 is a close-up perspective drawing of a mobile unit 32 which is included in the mobile security assembly 30 of FIG. 1

As shown in FIG. 2, the mobile security assembly 30 further includes a mobile unit 32 which may be mounted in the dashboard of the automobile in much the same manner as a conventional AM/FM radio. The anterior of mobile unit 32 includes a plurality of push buttons 33, indicator lights 35, alphanumeric display 34 and contrast adjustment knob 31, and a data keyslot 38 which receives a personal identification key 36.

The push buttons 33 are used to manually initiate and confirm specific help requests or a self-test.

Data keyslot 38 and personal identification key 36 provide information regarding the identity and characteristics of the mobile person. Personal information such as name and personal account number is digitally stored in a memory which is resident on the key 36. This personal information is read by the keyslot 38 when key 36 is inserted therein. A wealth of supplemental personal information may also be stored directly on key 36 or may be stored in a central dispatch station 40 database. The supplemental personal information may include social security number, names of relatives to contact in an emergency, special medical needs, and/or medical records, etc.

Likewise, remote unit 10 contains information regarding the identity and characteristics of the particular carrier. Minimally, a remote unit subscriber code is stored in a memory that is resident in the remote unit 10. Optionally, personal information such as name, social security number, names of relatives to contact in an emergency, special medical needs, and/or medical records, etc. may also be stored therein or may be stored in a central dispatch station 40 database. The remote unit subscriber code and any personal information is received by the mobile security assembly 30 when the remote unit 10 is activated. It is contemplated that a number of remote units 10 may be issued and will operate with each mobile security assembly 30, and each remote unit 10 will be programmed with a unique remote unit subscriber code.

In addition to the personal information stored on key 36 or in remote unit 10, system-specific information such as the serial number of the mobile unit 32 is stored in a memory which is resident in mobile unit 32. Supplemental vehicle-specific information such as the vehicle identification number, make, model, color, etc., may also be stored in mobile unit 32 or in a central dispatch station 40 database.

All personal, system and/or vehicle-specific data are made available to the central dispatch operator regardless of the many potential operators of the vehicle or holders of a remote unit 10. The quality of the combined information and the manner in which it is displayed at central dispatch station 40 allows the dispatch operator to coordinate a prompt and comprehensive response to any personal security situation which may befall the mobile person. The response capability is far superior to any existing security system.

Figure 3:
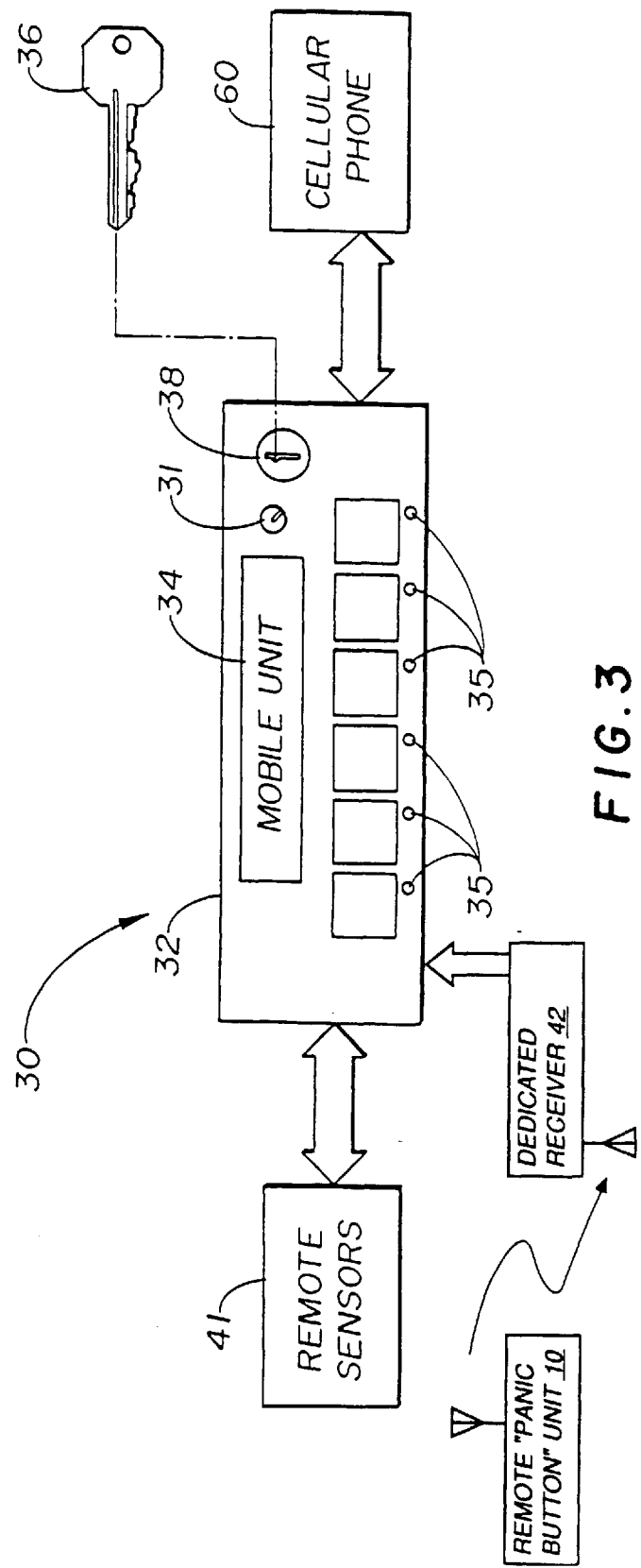
FIG. 3 is a block diagram of the circuitry in mobile security assembly 30 of FIG. 1.

FIG. 3 is a block diagram of the mobile security assembly 30 of FIG. 1. In addition to mobile unit 32, the assembly includes a cellular telephone 60 a plurality of remote sensors 41, and a dedicated receiver 42 for remote unit 10. The remote unit 10 communicates with the dedicated receiver 42 via a radio frequency link.

Cellular telephone 60 may be any conventional cellular telephone. It should be appreciated by one skilled in the art that other types of communication devices such as satellite transceivers may perform the function of the cellular telephone 60 and may easily be substituted therefor. Hence, the present invention should not be construed as limited to a cellular telephone.

Remote sensors 41 automatically initiate specific help requests upon detecting various alarm conditions. For instance, remote sensors 41 may include smoke or heat detectors for detecting a fire within the vehicle, a tamper switch or motion detector for detecting a possible theft of the vehicle, an impact detector for detecting a collision, a sensor for detecting activation of a vehicle air-bag, and any of numerous other sensor types for automatically detecting a wide variety of personal security situations. The above-described and many other sensors are well-known in the art and commercially available.

In the preferred embodiment of mobile unit 32, there are six push buttons 33 which are mounted on the face of mobile unit 32. These allow the mobile person to manually enter and confirm that a personal security situation has arisen. Push buttons 33 are conventional momentary switches (preferably touch-sensitive). Four of the push buttons 33 are dedicated to each of four common types of emergency assistance, i.e., fire, paramedics, police, and roadside service and are clearly labeled with the specific type of assistance. In addition, one of the push buttons 33 is marked "ENTER" and is provided to confirm the use of the emergency push buttons. This dual-entry convention insures that the emergency push buttons are not inadvertently depressed. Alternatively, if a single-entry convention is desired, the "ENTER" push button can be configured to cancel the use of an emergency push button within a predetermined amount of time. Finally, the sixth push button is marked "TEST" and is provided to initiate a self-test of the mobile security assembly 30.

Mobile unit 32 includes a display 34, which is preferably a liquid crystal display (LCD) for displaying messages to the mobile person. A contrast adjustment knob 31 is mounted proximate to the display 34.

A panel of indicator lights 35 is provided under push buttons 33 to indicate which of the push buttons have been depressed. In addition, an optional piezoelectric element or other audible signal may be incorporated to sound when a push button has been depressed.

Keyslot 38 is also mounted on the face of mobile unit 32 for convenient insertion of personal identification key 36. As explained, both are commercially available data entry components. For instance, Keyceptical$^R$ KC421 OPCB and Serial Data KEY$^R$ DK4000 by Datakey$^R$ may be used. Up to 512 bytes of personal information may be stored directly on the personal information key 36. At a minimum, the name and personal account number are stored to identify the mobile person.

The remote unit 10 is a conventional push-button RF transmitter, and the dedicated receiver 42 is a matched conventional RF receiver.

The general method of operation of the personal security system is described as follows.

Mobile unit 32 remains in a stand-by mode at all times before the personal identification key 36 has been inserted in keyslot 38. While in stand-by mode, mobile unit 32 remains partially operational and continuously polls remote sensors 41 and dedicated receiver 42 to detect vehicular security conditions. Position locator 70 also remains on during stand-by mode and communications through cellular telephone 60 to central dispatch station 40 may be established. Hence, the location of the vehicle can be monitored at all times at central dispatch station 40. However, the push buttons 33 are disabled in stand-by mode.

A person entering the vehicle must first insert a personal identification key 36 in order to fully activate the mobile security assembly 30. When key 36 has been inserted, digitally encoded personal information is automatically read from the key 36 and is stored within mobile unit 32 for subsequent communication to the central dispatch station 40. The manual push buttons 33 become operational and mobile unit 32 enters full security mode.

When in full security mode, a help request may be entered manually at push buttons 33 or remote unit 10 (via dedicated receiver 42), or it may be automatically detected at a remote sensor 41.

When remote unit 10 is activated, an encoded signal is automatically transmitted to dedicated receiver 42 which is mounted within the vehicle.

The remote unit 10 and dedicated receiver 42 augment the system by providing the capability of transmitting a help request when in the general proximity of vehicle (and mobile unit 30). Upon activating the remote unit 10 by depressing the "panic button", a coded RF signal is sent to the dedicated receiver 42. Receiver 42 supplies a remote unit subscriber (or identification) number to the mobile unit 30, which in turn causes personal security message transmission to the central station 40. In this case the message also includes the remote unit subscriber number in addition to any personal identification already read from personal identification key 36. Upon initial activation of remote unit 10, the specific remote unit identification code is permanently stored. This way, when the same code is detected again, the receiver 42 may discriminate amongst a number of possible codes from different remote units. This discrimination capability allows the unique identification of the activated remote unit 10 from amongst many possible remote units all of which have been "trained" to communicate with the receiver 42. Consequently, the person who has pressed the "panic button" can be identified from the total set of people, all of whom carry remote units 10 that can communicate with receiver 42. The specific remote unit identification code may be correlated to the identity of the holder of the remote unit 10, and a look-up table data base may be maintained at the central station 40. In addition, this prevents false detection by other mobile units 30 that may by chance be within range of the transmitting remote unit 10.

Upon receipt of any help request described above, the mobile unit 32 dials the telephone number of central station 40. When a cellular communication link is established, the mobile unit 32 transmits an array of digitally encoded data. The transmitted data is received by central dispatch station 40. The central dispatch station 40 processes the data and displays all pertinent information to a dispatch operator. The information is displayed in the form of a quickly recognizable symbol such as a shield (for police), a fire (for the fire department), a cross (for medical assistance), or a tow-truck (for roadside service). The symbol appears superposed on a digitized map at a position which corresponds to the location of the mobile entity. Both the vehicle-specific and personal information is displayed adjacent to the symbol. Central dispatch station 40 provides a zoom function to allow the operator to reduce or enlarge the specific area of the digitized map in which the emergency symbol appears. For instance, the dispatch operator may begin with a general map of the United States and the emergency symbol would indicate a state in which an emergency has occurred. The dispatch operator may then zoom in on a particular city, then area, and finally, the street on which the mobile entity 20 is proceeding. It has been found that these display capabilities greatly assist the dispatch operator in directing the proper authorities to the exact location of the vehicle for emergency assistance.

Another feature of the personal security system is a voice mode which allows the operator of the central dispatch station 40 to switch from digital (serial) communication to voice communications at any time. In voice mode, the vehicle operator can provide essential instructions to the mobile person prior to the arrival of the responding agents, or the dispatch operator can query the mobile person to acquire any additional information which may be useful. Voice mode is a useful feature when the vehicle operator signals a need for service. The central dispatch operator can further determine the appropriate type of service.

Another important feature is tone recognition which can be utilized while in voice mode to give the central dispatch operator direct control over selected vehicle functions. By depressing touch-tone telephone 48 keys while in voice mode, the central dispatch operator can sound various tones. The mobile unit 32 is provided with the capability of recognizing these tones and controlling various vehicle functions in accordance therewith. This feature is extremely useful in an emergency when, for instance, the vehicle 20 is obscured. Electromagnetic, visual or audible signals can be emitted to help the responding authorities locate the vehicle and mobile person. Also, if tampering with the vehicle is detected by one of the remote sensors 41, the microcontroller 310 or operator of the central dispatch station 40 can activate one of the relays in actuator bank 50 to sound the vehicle horn, illuminate the headlights, etc. If an actual theft is detected, the dispatch operator can immediately cut power to the engine.

Figure 4:
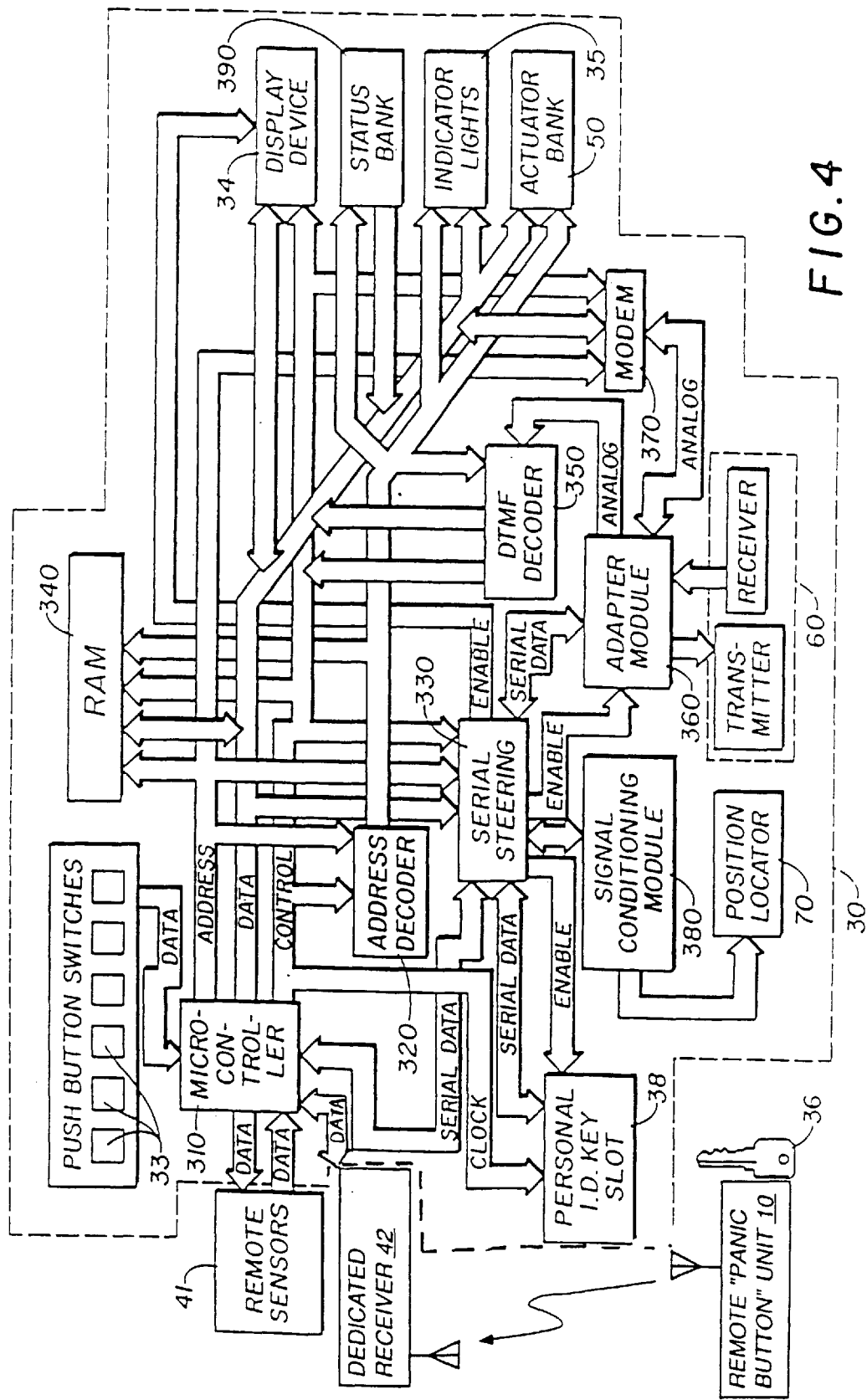
FIG. 4 is a detailed block diagram of the circuitry of FIG. 3.

FIG. 4 shows a detailed block diagram of the mobile security assembly 30 which illustrates the internal circuitry of the mobile unit 32. The internal circuitry includes a microcontroller 310 which receives external inputs from push buttons 33, dedicated receiver 42 and remote sensors 41. Microcontroller 310 may be any conventional microcontroller which incorporates an on-board universal asynchronous receiver-transmitter (UART), clock/timer and internal memory. For example, an Intel® 87C51FB may be used.

The internal circuitry also includes a number of peripheral devices connected to microcontroller 310 via the following bidirectional busses: a CONTROL bus which allows microcontroller 310 to selectively enable the device; a DATA bus which allows microcontroller 310 to transfer data to/from a selected device; and an ADDRESS bus which allows microcontroller 310 to specify a memory address in a selected device. The peripheral devices include a RAM 340 which is connected by the CONTROL, DATA, and ADDRESS busses to microcontroller 310 to serve as working memory, a position locator 70, actuator bank 50, and the following devices which facilitate serial communication and control via cellular telephone 60: a serial steering module 330 which is connected by the CONTROL, DATA, and ADDRESS busses to microcontroller 310 to manage the transfer of serial data between the microcontroller 310 and other serial devices; an adapter module 360 connected between cellular phone 60 and serial steering module 330 which adapts the system for use with a specific brand and model of cellular phone 60; a modem 370 which is connected between the adapter module 360 and microcontroller 310 (via the CONTROL, DATA, and ADDRESS busses) for asynchronous serial communication; and a Dual Tone Multifrequency (DTMF) decoder 350 for sensing tones communicated to cellular phone 60 and generating control bit patterns in response thereto for operating actuator bank 50.

Serial steering module 330 is comprised of one or more conventional programmable logic arrays (PALs) such as, for example, 16L8 PALs. The serial steering module 330 directs serially-encoded input received from the UART internal to microcontroller 310 to the adapter module 360, personal identification keyslot 38, or signal conditioning module 380 in accordance with control data provided by the microcontroller 310.

RAM 340 is a conventional 8K by 8 static random access memory.

The Dual Tone Multifrequency (DTMF) decoder 350 is a conventional tone-sensing device for generating control bit patterns in response to selected tones. DTMF decoder 350 is enabled by microcontroller 310 when a voice mode request is sent by the central dispatch operator. Once in voice mode, tones of various frequencies are emitted when the operator of central dispatch station 40 depresses the telephone keys. DTMF 350 differentiates the tone and transmits a unique data word in response to each tone. The data may be interpreted by microcontroller 310 or it may be used to directly access and control any of the peripheral devices, including the display device 34 and actuator bank 50.

Modem 370 is preferably a conventional single-chip modem such as a 73K222U from Silicon Systems, Inc.$^R$.

The display 34 comprises a conventional octal bus transceiver connected via the CONTROL, DATA, and ADDRESS busses to microcontroller 310 and a 20 by 2 character LCD connected to the octal bus transceiver for displaying messages to the mobile person. A potentiometer (not shown) is preferably connected to display 34 to allow contrast adjustment.

Status bank 390 comprises a conventional eight-bit register coupled to the DATA bus and address decoder 320 through an octal line driver. An eight-bit data word is stored in status bank 390 to indicate the status of mobile security assembly 30. Hence, status bank 390 may be accessed from the microcontroller 310 in mobile unit 32. Central dispatch station 40 may then obtain the contents of status bank 390 from microcontroller 310.

The panel of indicator lights 35 comprises six conventional LEDs driven by an octal D-type latch which is in turn coupled to the DATA bus and address decoder 320. The indicator lights 35 indicate which of push button switches 33 has been depressed.

Actuator bank 50 comprises a conventional bank of relays each coupled to the DATA bus through a conventional latch for digital activation. Actuator bank 50 is also coupled to the address decoder 320. The relay coils in actuator bank 50 may be individually activated by microcontroller 310 or directly by the central dispatch station 40. This configuration provides the dispatch operator with direct control over actuator bank 50. The individual relay contacts are series-connected throughout the vehicle electrical system to allow control of selected vehicle functions. For instance, if a medical emergency is communicated to the central dispatch station 40, the dispatch operator can activate one or more relays in actuator bank 50 to trigger an electromagnetic or visual beacon (such as flashing headlights) and/or an audible signal (such as the vehicle horn) to help the responding authorities locate the mobile person when the vehicle is otherwise obscured. Time is often of the essence in such situations, and the time saved by this feature may save a life. Also, if tampering with the vehicle is detected by one of the remote sensors 41, the microcontroller 310 or operator of the central dispatch station 40 can activate one of the relays in actuator bank 50 to sound the vehicle horn, illuminate the headlights, etc. If an actual theft is detected, the dispatch operator can immediately cut power to the engine.

Status bank 390, indicator lights 35, and actuator bank 50 are configured as memory-mapped input/output devices. For this purpose, these devices are coupled to the CONTROL and ADDRESS busses of microcontroller 310 through an address decoder 320. Address decoder 320 enables a selected one of these devices in accordance with an address generated by microcontroller 310. In addition, status bank 390, indicator lights 35, and actuator bank 50 are connected by the DATA bus to microcontroller 310 and, when enabled, may be controlled thereby.

The position locator 70 may be a conventional global positioning system receiver (GPS) such as a Rockwell$^R$, or alternatively, a LORAN-C system such as a J.E.T$^R$. In both cases, many suitable models are commercially available. Position locator 70 is used to determine and supply accurate location coordinate data to the mobile unit 32.

The signal conditioning module 380 comprises a conventional logic level converter such as a Maxim$^R$ TTL-to-RS232 converter for interfacing the position locator 70. Signal conditioning module 380 is connected between the position locator 70 and the serial steering module 330 for formatting the latitude and longitude coordinate data from position locator 70 for standard RS-232C serial data transmission.

The adapter module 360 is enabled by the serial steering module 330 to transmit serially-encoded data supplied by modem 370. In addition to straight-through data transmission, the adapter module must adapt the mobile security assembly to the specific brand and model of cellular telephone 60 which is employed. This is because handsets of conventional cellular telephones emit control codes for controlling the operation of the cellular transmitter/receiver. Different cellular telephones employ different control codes and different communication protocols between the cellular handset and transmitter/receiver.

The remote unit 10 is a conventional push-button RF transmitter, and the dedicated receiver 42 is a matched conventional RF receiver. Both are currently available from, for example, DesignTech International, Inc. of Springfield, Va. A hand held radio transmitter is preferred, and 1"×2" models are available with a single "panic button" momentary activation switch, and a suitable built-in antenna.

FIG. 5 illustrates a block diagram of an exemplary adapter module. The cellular telephone handset 61 is unplugged from the cellular transceiver 62 and is instead plugged into a mobile unit 32 connector, which in turn connects to adapter module 360. Likewise, the mobile unit 32 is provided with a connecting cord which is also connected to adapter module 360. The connecting cord is plugged into the cellular transceiver 62. The adapter module 360 acts as an intermediary. Depending on the particular make and model of cellular telephone 60, certain lines are routed straight through and others are routed to a bank of relays 363 such as an OMRON G6A274-P. The single-pole, single-throw relays are controlled by the microcontroller 310. This way, microcontroller 310 may tap into any of the lines from handset 61 in order to accomplish the purposes of the mobile unit 32. A conventional line driver 365 is also provided as necessary for lines requiring additional source current.

Figure 6B:
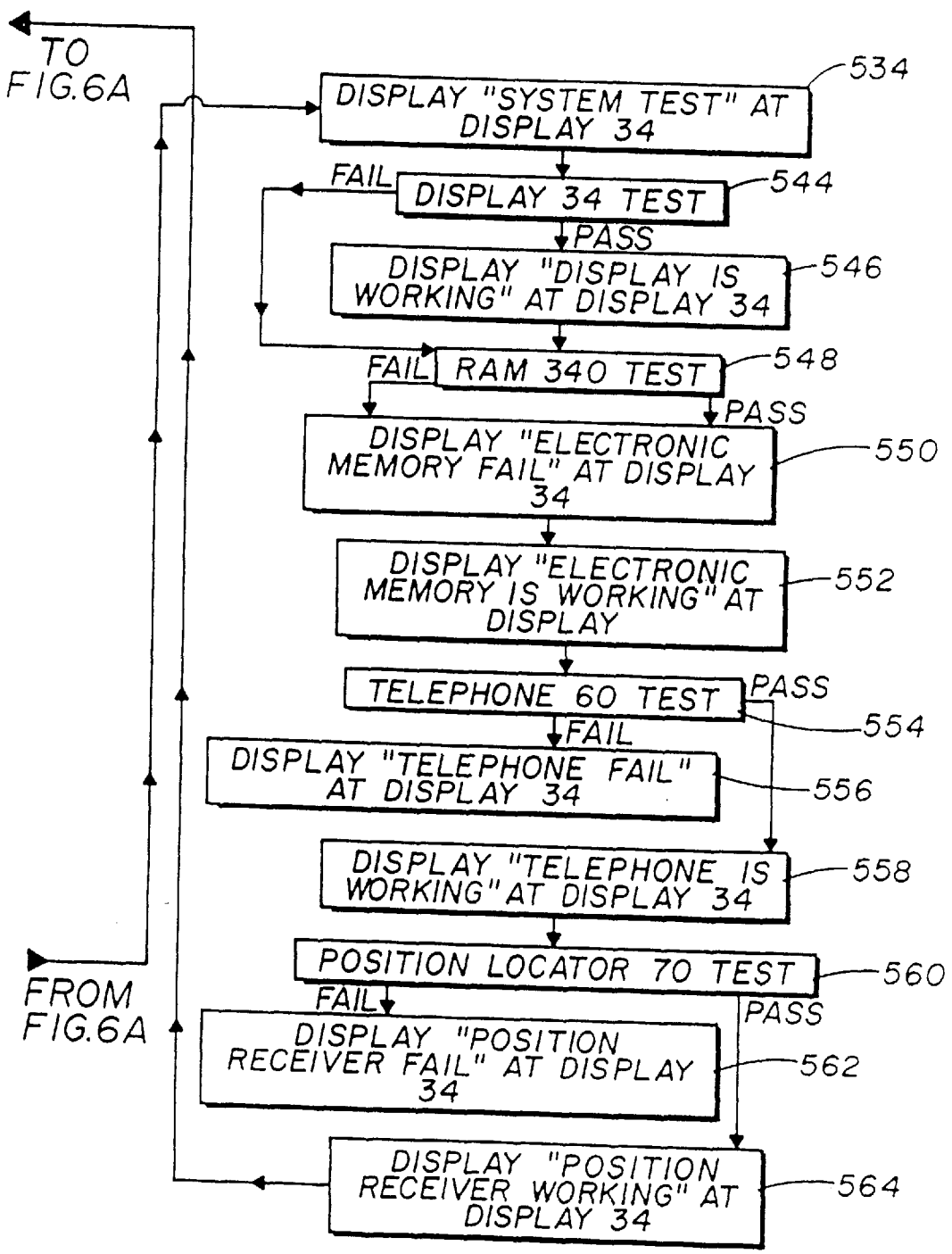

The detailed operation of the preferred embodiment of the personal security system will now be described with reference to the flow-chart of FIG. 6.

In step 500, the system is initialized when a mobile person inserts his or her personal identification key 36 in keyslot 38. Microcontroller 310 enters full security mode and enables keyslot 38 to read all personal information from data key 36. The personal data is transferred to microcontroller 310 where it is stored in an on-board RAM along with vehicle-specific data.

In step 510, the microcontroller 310 polls position locator 70 for new latitude and longitude coordinate data and a reliability rating. Along with each set of coordinate data, conventional LORAN-C and GPS position locators generally provide an indication of the reliability of the coordinates. For example, a JET$^R$ LORAN-C position locator emits a reliability rating ranging from 11 to 88 which represents a progressively deteriorating reliability. It is an essential feature of the present invention that these reliability ratings are put to best use. In the preferred embodiment of the present invention, the raw reliability rating obtained from the position locator 70 is reassigned an error code comprising one of letters A–D. Each time microcontroller 310 polls position locator 70 for new coordinate data and reliability rating, the coordinate data and error code are displayed at display 34 and are transferred to microcontroller 310 where they are stored in the on-board RAM.

In step 512, the microcontroller 310 sets an internal timer to an elapsed time after which the microcontroller 310 will again poll the position locator 70.

The microcontroller 310 repeatedly polls the position locator 70 at an approximate rate of every two seconds in accordance with the internal timer. If desired, the speed and heading of the vehicle may be computed from the accumulated data at each poll.

As shown in step 514, each time the microcontroller 310 obtains new coordinate data and error code from position locator 70, the personal security system message is assembled for transmission to the central dispatch station 40. In the preferred embodiment, the message comprises 128 bytes of data, including the following components:

current latitude
current longitude
current heading
current speed
best latitude
best longitude
best heading
best speed
quality count
personal identification/account number from personal identification key 36
system identification/serial number of mobile unit 32
personal/vehicular security condition code.

The current latitude, current longitude, current heading, and current speed are derived from the most recent polling of position locator 70. The best latitude, best longitude, best heading, and best speed are computed as the most recent values which were obtained along with an "A" error code. Initially, the best values are empty. However, as soon as the current polling is rated an "A", then the current values become the best values. Likewise, at each poll thereafter where the current polling is rated an "A", then the existing best latitude, best longitude, best heading, and best speed are updated to the current latitude, current longitude, current heading, and current speed. Conversely, if the error code of the current polling is less than an "A" rating, then the best latitude, best longitude, best heading, and best speed are not updated. This way, there is always a set of fallback best values in case the position locator 70 "blinks". In addition, each time that the error code of the current polling is less than an "A" rating, then microcontroller 310 begins a second timer. This elapsed time (beginning when the last best values were obtained) is a "quality count". The quality count is also included in the formatted message to give the central dispatch operator an idea of the trustworthiness of the best coordinate data.

In step 516, the current coordinate data is displayed at display 34.

In step 518, the remote sensors 41, the push button switches 33, and the dedicated receiver 42 are sequentially polled to determine whether a personal security situation exists or whether system test has been initiated. If no such condition is detected and the elapsed time counted at the internal timer has not expired, then the program repeats step 518.

As shown in step 520, if the elapsed time counted at the internal timer has expired, then the program returns to step 510 and the position locator 70 is polled for new coordinate data.

On the other hand, if a personal security situation is detected at step 518A by one of remote sensors 41, remote unit 10 or push button switches 33, then the program continues to step 521 where microcontroller 310 attempts to transmit the personal security system message.

At step 522, the microcontroller 310 begins to time a redial interval.

At step 524, the microcontroller 310 causes adapter module 360 to seize control of the cellular telephone 60. This is done even if the cellular phone was already in use.

At step 526, the microcontroller 310 dials the central dispatch station 40.

As shown in step 527, if the central dispatch station 40 fails to answer, the redial counter expires and the program returns to step 522. Otherwise, if the central dispatch station 40 answers, then at step 528 the microcontroller 310 again polls position locator 70 for new latitude and longitude coordinate data and the personal security system message is formatted for transmission to the central dispatch station 40.

At step 529, the personal security system message is transmitted.

As shown in step 530, to provide assurance to the vehicle operator, the central dispatch station 40 must acknowledge receipt of the personal security system message or the program returns to step 522. The call-back confirmation is indicated on the alphanumeric display device 34.

Once the personal security system message has been transmitted, the central dispatch station 40 decodes the personal security system message and prepares a properly scaled map display with the appropriate emergency symbol superpositioned according to the best coordinate data. An information window is displayed near the emergency symbol to convey all personal information and vehicle-specific information to the dispatch operator.

As shown in step 531, the central dispatch operator may initiate voice mode at any time or, as shown in step 532, may reinitiate data mode.

If system test is initiated at step 518B, then the program jumps to step 534 and the self-test routine illustrated in steps 534–564 is conducted.

Figure 7:
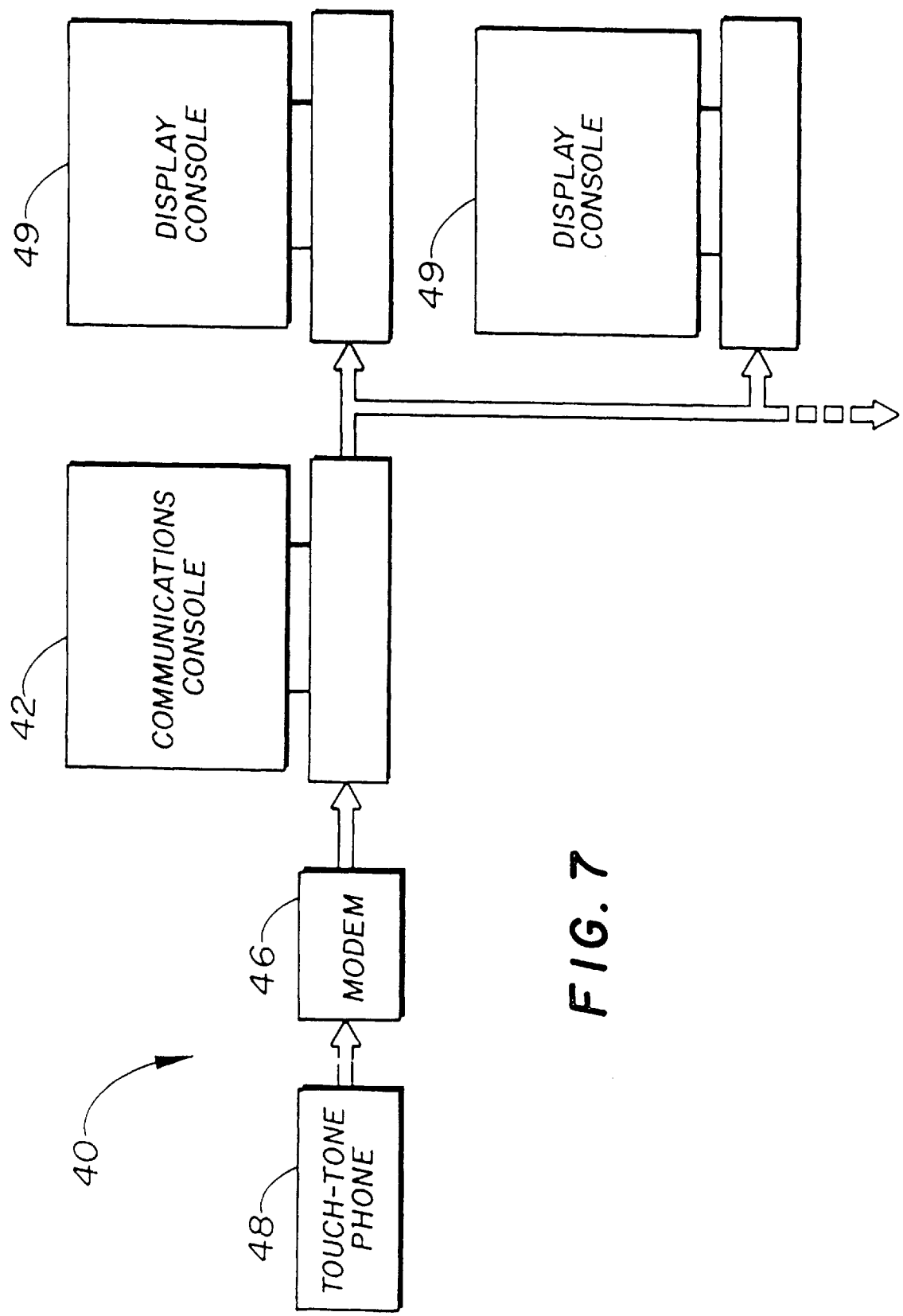
FIG. 7 is a block diagram of central dispatch station 40.

FIG. 7 is a block diagram of the presently preferred embodiment of the central dispatch station 40. The central dispatch station 40 generally comprises a conventional touch-tone telephone 48 connected to a communications console 42, which is in turn connected to one or more display consoles 49. All of the communications console 42 and display consoles 49 may be any commercially available brand of microcomputer which includes a video monitor. Incoming cellular calls from mobile unit 30 are received and logged by communications console 42 via touch-tone telephone 48 and modem 46. The personal security message is decoded and transmitted to display console 49. Numerous display consoles 49 may be networked to a single communications console 42 and incoming personal security messages may be allocated to the appropriate display consoles 49 to accommodate a high frequency of incoming calls. The display console(s) 49 continuously run a conventional digital map program. Preferably, the map program includes the following features:

- capable of displaying detailed geographical area maps complete with street names and addresses;
- capable of real-time plotting of coordinate data at the appropriate position on the map;
- user-controlled zoom function; and
- programmable display windows, symbols, and legend.

A number of suitable map programs incorporating these features are commercially available, for example, from Map Info® of Troy, N.Y.

Although the preferred embodiment requires a separate communications console 42 and display console(s) 49, the respective functions of the two consoles may easily be accomplished in a single microcomputer by multi-tasking.

Figure 8:
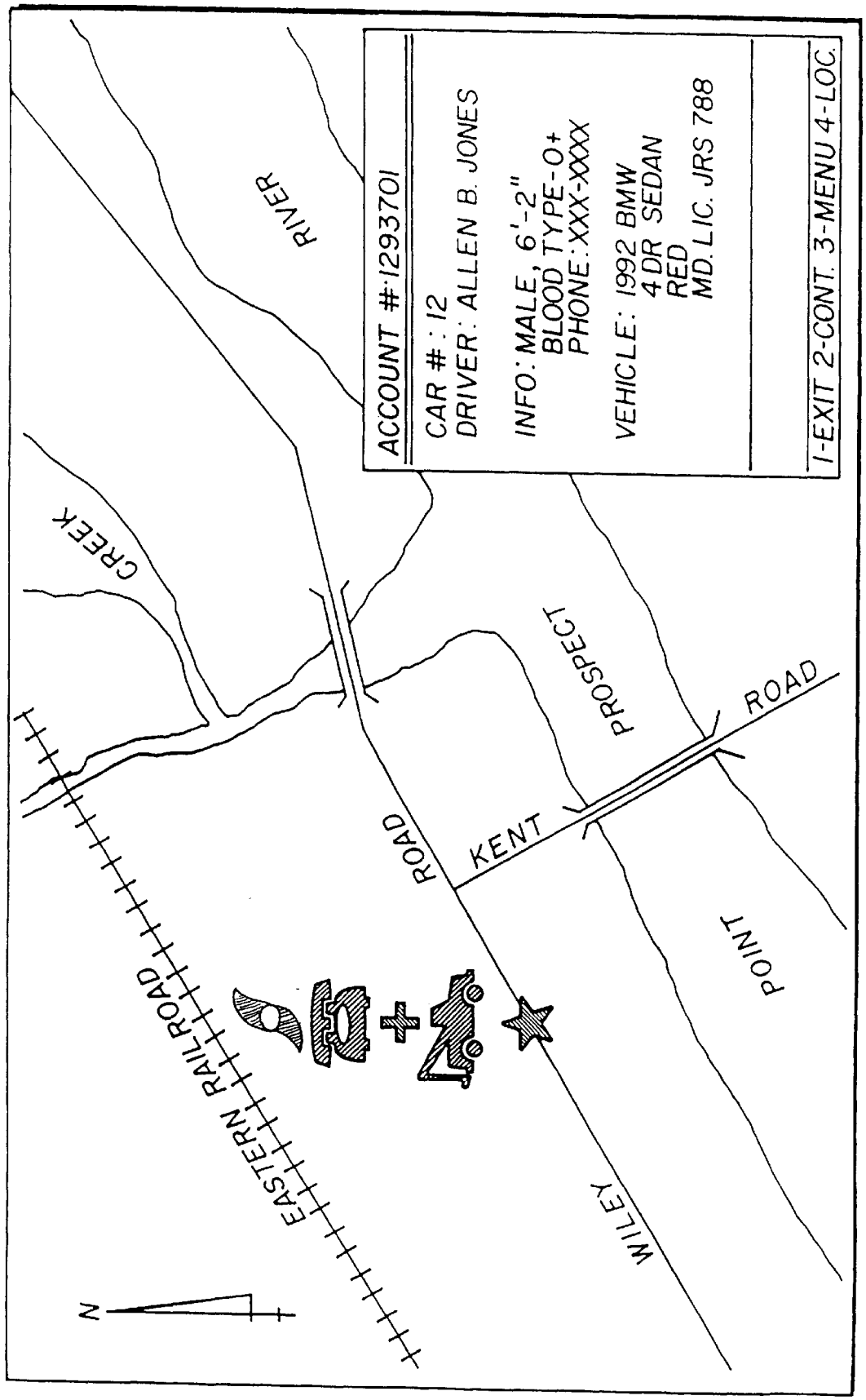
FIG. 8 is an illustration of a display output from the display console 49 of central dispatch station 40.

FIG. 8 is a detailed illustration of the display which appears at display console 49. The alarm symbol corresponding to the type of emergency assistance required is superimposed on the map at the position of the mobile entity. For instance, a mobile person signalling difficulty at the corner of Wiley Road and Kent Road would be represented by the appropriate emergency symbol shown at the corresponding position on the map. Similarly, a pedestrian signalling difficulty by means of the remote unit 10 would be represented by, for example, a hurricane symbol as described at the top of the map. In addition, the vehicle subscriber account number, the identification code for remote unit 10, the vehicle make and model, the license number, and any relevant personal or vehicle-specific supplemental information is superposed next to the emergency symbol. The central dispatch station operator immediately contacts the proper authorities as indicated by the emergency symbol, and/or enters voice mode.

By scanning adjacent maps and zooming in on the vehicle position from broader maps of the surrounding areas, the central dispatch station operator is able to direct the authorities to the exact position of the mobile entity 20 by the shortest possible route. In addition, the central dispatch station operator can identify the make, model, and license number of the vehicle to the authorities and can actuate blinking headlights and/or sound the horn via the DTMF 350 and actuator bank 50 in mobile unit 30. The dispatch operator can also provide supplementary information such as special health conditions of the vehicle operator (for instance, diabetes, heart problems, etc.).

Having now fully set forth the preferred embodiments and certain modifications of the concept underlying the present invention, various other embodiments as well as certain variations and modifications of the embodiments herein described will obviously occur to those skilled in the art upon becoming familiar with said underlying concept. It is to be understood, therefore, that within the scope of the appended claims, the invention may be practiced other than as specifically set forth in the disclosure.

We claim:

1. An apparatus for monitoring a vehicle passenger within a range of their vehicle, comprising:
   - at least one portable remote unit each carried by a passenger, said remote units each including an RF transmitter activated by a pushbutton to transmit a remote unit subscriber code, said subscriber code being uniquely assigned and stored in said portable remote unit for identification of the particular passenger;
   - a mobile security assembly conveyed jointly with a vehicle, said mobile security assembly further comprising;
   - a mobile unit having a programmable memory containing identification information characteristic of said vehicle, a keypad for allowing manual indication of an alarm condition, a dedicated receiver for indicating an alarm condition upon receipt of said remote unit subscriber code from said portable remote unit, said receiver having a plurality of said remote unit subscriber numbers stored permanently therein to allow, communication with multiple remote units and discrimination of particular transmitting remote units by subscriber number, a position locator for providing position coordinates indicating a location of said mobile entity, and a microcontroller connected to said programmable memory, receiver, keypad and position locator receiver, said microcontroller being triggered when an alarm condition is indicated to input said position coordinates from said position locator to said microcontroller and to therein format a digital security message indicating said alarm condition, said remote unit subscriber code, said identification information characteristic of said vehicle, and said position coordinates;
   - a portable communication device connected to said mobile unit and conveyed therewith for transmitting said security message to a central dispatch station; and
   - a central dispatch station for receiving said security message from said mobile security assembly and decoding said remote unit subscriber code, said identification information characteristic of said vehicle, position coordinates, and alarm condition from said security message, said central dispatch station including a video display for displaying a digital map to a dispatch operator, whereby said central dispatch station automatically correlates said position coordinates to said digital map and displays said remote unit subscriber code, said identification information characteristic of said vehicle, position coordinates, and alarm condition indicated thereon for allowing said dispatch operator to initiate a response targeted to said particular passenger.

2. The apparatus for monitoring a vehicle operator according to claim 1, wherein said mobile security assembly further comprises a plurality of remote sensors for automatically sensing an alarm condition and indicating said alarm condition to said mobile unit.

3. The apparatus for monitoring a vehicle operator according to claim 2, wherein said plurality of remote sensors includes any one from among the group of collision sensor, theft sensor, medical condition sensor, and vehicle malfunction sensor.

4. The apparatus for monitoring a vehicle operator according to claim 1, wherein said vehicle has an on-board electrical system, and wherein said mobile unit further comprises a plurality of actuators connected between the vehicle electrical system and said microcontroller, said actuators being actuable by said microcontroller for allowing remote control of selected vehicle functions.

5. The apparatus for monitoring a vehicle operator according to claim 1, wherein said portable remote unit transmits a modulated remote unit subscriber number to the mobile unit, which in turn initiates personal security message transmission to the central station.

6. The apparatus for monitoring a vehicle operator according to claim 1, wherein said remote unit is stored in a trunk of said vehicle to give persons locked therein a means of escape.

7. A system for monitoring persons associated with a vehicle, comprising:

- a plurality of portable remote units, each remote unit including an RF transmitter activated by a pushbutton to indicate an alarm condition by transmitting a unique remote unit subscriber number;
- a mobile security assembly conveyed jointly with a vehicle, said mobile security assembly further comprising,
- a mobile unit having a programmable memory containing identification information characteristic of said vehicle,
- a keypad for allowing manual indication of an alarm condition,
- a dedicated receiver having a plurality of remote unit subscriber numbers stored permanently therein to allow said receiver to communicate with multiple remote units and to discriminate particular transmitting remote units by their subscriber numbers, said receiver indicating an alarm condition upon receipt of a subscriber number from a remote unit,
- a position locator for providing position coordinates indicating a location of said mobile entity, and
- a microcontroller connected to said programmable memory, receiver, keypad and position locator receiver, said microcontroller being triggered when an alarm condition is indicated to input said position coordinates from said position locator to said microcontroller and to therein format a digital security message indicating said alarm condition, identification information and said position coordinates;
- a portable communication device connected to said mobile unit and conveyed therewith for transmitting said security message to a central dispatch station; and
- a central dispatch station for receiving said security message from said mobile security assembly and decoding said identification information, position coordinates, and alarm condition from said security message, said central dispatch station including a video display for displaying a digital map to a dispatch operator, whereby said central dispatch station automatically correlates said position coordinates to said digital map and displays said identification information, position coordinates, and alarm condition indicated thereon.

8. The system for monitoring vehicle passengers according to claim 7, wherein said remote unit is stored in a trunk of said vehicle to give persons locked therein a means of escape.

* * * * *